(12) United States Patent
Neumann et al.

(10) Patent No.: US 9,697,372 B2
(45) Date of Patent: Jul. 4, 2017

(54) METHODS AND APPARATUSES FOR SECURING TETHERED DATA

(71) Applicant: Raytheon Company, Waltham, MA (US)

(72) Inventors: Matthew D. Neumann, Dallas, TX (US); Michael W. Smith, Murphy, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/846,974

(22) Filed: Mar. 19, 2013

(65) Prior Publication Data

US 2014/0289517 A1    Sep. 25, 2014

(51) Int. Cl.
*G06F 21/62* (2013.01)
*H04L 29/06* (2006.01)

(52) U.S. Cl.
CPC ...... *G06F 21/6209* (2013.01); *H04L 63/0428* (2013.01); *G06F 2221/2143* (2013.01); *G06F 2221/2149* (2013.01); *H04L 63/0876* (2013.01); *H04L 63/0892* (2013.01); *H04L 2463/041* (2013.01)

(58) Field of Classification Search
CPC .................................................. G06F 21/6209
See application file for complete search history.

(56) References Cited

U.S. PATENT DOCUMENTS

| | | | |
|---|---|---|---|
| 5,265,159 A * | 11/1993 | Kung | 713/193 |
| 6,772,340 B1 * | 8/2004 | Peinado et al. | 713/168 |
| 7,146,340 B1 * | 12/2006 | Musson | 705/57 |
| 7,177,426 B1 * | 2/2007 | Dube | G06F 21/6209 380/262 |
| 7,324,974 B1 * | 1/2008 | Cho et al. | 705/51 |
| 7,535,586 B2 * | 5/2009 | Kumashio | 358/1.14 |
| 8,196,029 B1 * | 6/2012 | Rucker et al. | 715/200 |

(Continued)

FOREIGN PATENT DOCUMENTS

| WO | WO-2014153312 A1 | 9/2014 |
|---|---|---|
| WO | WO-2014153315 A2 | 9/2014 |

OTHER PUBLICATIONS

Chang, Yue Shan; Cheng, Hsiang-Tai; Lai, Hsuan-Jen; "Metadata Miner Assisted Integrated Information Retrieval for Argo Ocean Data", International Conference on Systems, Man and Cybernetics, IEEE, Oct. 11-14, 2009, pp. 2930-2935.*

(Continued)

*Primary Examiner* — Victor Lesniewski
(74) *Attorney, Agent, or Firm* — Schwegman Lundberg & Woessner, P.A.

(57) ABSTRACT

Embodiments of a method and apparatus for securing and accessing files are generally described herein. In some embodiments, the method includes adding a communication portion to the file. The communication portion may communicate with an authentication agent on the first computing device. The method may include encrypting data of the file using a first key received through the communication portion from the authentication agent. The first key may be generated based on identification information of a second computing device in a trusted network of computing devices with the first computing device. The method may include saving the file to a remote file storage location.

16 Claims, 6 Drawing Sheets

(56) References Cited

U.S. PATENT DOCUMENTS

| | | | |
|---|---|---|---|
| 8,689,015 B2* | 4/2014 | Jeffries et al. | 713/193 |
| 8,788,816 B1* | 7/2014 | Spaulding et al. | 713/165 |
| 2003/0120684 A1* | 6/2003 | Zuili et al. | 707/200 |
| 2004/0003091 A1* | 1/2004 | Coulthard et al. | 709/227 |
| 2004/0128376 A1* | 7/2004 | Matsune | H04L 63/08 709/223 |
| 2005/0063542 A1* | 3/2005 | Ryu | H04L 63/062 380/259 |
| 2005/0114672 A1* | 5/2005 | Duncan et al. | 713/182 |
| 2007/0005974 A1* | 1/2007 | Kudou | G06F 21/606 713/171 |
| 2007/0058550 A1* | 3/2007 | Nogawa | H04L 43/0811 370/236.2 |
| 2007/0294645 A1 | 12/2007 | Medvinsky et al. | |
| 2008/0133494 A1* | 6/2008 | Won-Kyoung | H04L 12/66 |
| 2008/0253562 A1* | 10/2008 | Nyberg | H04L 9/0833 380/30 |
| 2009/0067624 A1* | 3/2009 | Cobelo et al. | 380/46 |
| 2009/0193258 A1* | 7/2009 | Newman | 713/176 |
| 2009/0249492 A1* | 10/2009 | Boesgaard Sorensen | G06F 21/556 726/27 |
| 2009/0292930 A1* | 11/2009 | Marano et al. | 713/189 |
| 2009/0307249 A1* | 12/2009 | Koifman et al. | 707/101 |
| 2009/0307496 A1* | 12/2009 | Hahn | H04L 63/0428 713/171 |
| 2009/0313702 A1* | 12/2009 | Mandava | 726/27 |
| 2009/0319529 A1* | 12/2009 | Bartlett et al. | 707/9 |
| 2010/0031349 A1 | 2/2010 | Bingham | |
| 2010/0146269 A1* | 6/2010 | Baskaran | 713/165 |
| 2010/0205648 A1* | 8/2010 | Saadat et al. | 725/153 |
| 2010/0318633 A1* | 12/2010 | Abzarian | H04L 29/12028 709/219 |
| 2010/0325423 A1* | 12/2010 | Etchegoyen | H04L 63/0428 713/153 |
| 2011/0235799 A1 | 9/2011 | Sovio et al. | |
| 2012/0084544 A1 | 4/2012 | Farina et al. | |
| 2012/0144195 A1* | 6/2012 | Nair et al. | 713/168 |
| 2012/0167164 A1* | 6/2012 | Burgess | G06F 21/00 726/1 |
| 2012/0210126 A1* | 8/2012 | Johnson | G06F 17/30 713/165 |
| 2012/0290556 A1* | 11/2012 | Acosta-Cazaubon | G06Q 30/02 707/711 |
| 2013/0145171 A1* | 6/2013 | Hsien | 713/184 |
| 2013/0291056 A1* | 10/2013 | Gaudet | H04W 12/06 726/1 |
| 2013/0332723 A1* | 12/2013 | Tan et al. | 713/150 |
| 2014/0040422 A1* | 2/2014 | Jaggi | H04L 63/062 709/217 |
| 2014/0068256 A1* | 3/2014 | Sima | 713/165 |
| 2014/0082717 A1* | 3/2014 | Kang et al. | 726/9 |
| 2014/0122544 A1* | 5/2014 | Tran et al. | 707/825 |
| 2014/0122866 A1* | 5/2014 | Haeger et al. | 713/153 |
| 2014/0136835 A1* | 5/2014 | Sharpe | 713/153 |
| 2014/0274037 A1* | 9/2014 | Ganu | H04W 8/14 455/432.3 |
| 2014/0289524 A1 | 9/2014 | Neumann et al. | |

OTHER PUBLICATIONS

Ghobadi, Alireza; Eswaran, C.; Muthuvelu, Nithiapidary; Tan, Ian K.T.; Kee, Yong Lee; "An Adaptive Wrapper Algorithm for File Transfer Applications to Support Optimal Large File Transfers", 11th International Conference on Advanced Communication Technology, IEEE, Feb. 15-18, 2009, pp. 315-320.*

Wilkinson, J.H.; Morgan, O.F.; "Wrapper Files—The Key to Network Technology", International Broadcasting Convention, Sep. 12-16, 1997, pp. 374-379.*

"International Application Serial No. PCT/US2014/030958, International Search Report mailed Aug. 27, 2014", 4 pgs.

"International Application Serial No. PCT/US2014/030958, Written Opinion mailed Aug. 27, 2014", 6 pgs.

"International Application Serial No. PCT/US2014/030961, International Search Report mailed Oct. 10, 2014", 3 pgs.

"International Application Serial No. PCT/US2014/030961, Written Opinion mailed Oct. 10, 2014", 5 pgs.

Menezes, A., et al., "Chapter 13: Key Management Techniques", Handbook of Applied Cryptography, CRC Press, Boca Raton, FL, [online] [retrieved on Aug. 20, 2014]. Retrieved from the Internet: <URL: http://www.cacr.math.uwaterloo.ca/hac/>, (1997), 543-590.

Zonenberg, Andrew, "Distributed Hash Cracker: A Cross-Platform GPU-Accelerated Password Recovery System", [online]. [retrieved on Jul. 1, 2013]. Retrieved from the Internet: <URL: http://web.archive.org/web/20130701000000*/http://www.cs.rpi.edu/~zonena/papers/cracker.pdf>, (Apr. 28, 2009), 1-6.

"International Application Serial No. PCT/US2014/030958, International Preliminary Report on Patentability mailed Oct. 1, 2015", 7 pgs.

* cited by examiner

METHODS AND APPARATUSES FOR SECURING TETHERED DATA

TECHNICAL FIELD

Some embodiments relate to file security. Some embodiments relate to creating environment-specific encryption keys for file security.

BACKGROUND

Corporations and government entities may seek to reduce or eliminate instances of unauthorized access to various types of sensitive information. Some systems may reduce or prevent unauthorized access by requiring users to log on to file storage systems with credentials such as user names and passwords. These systems, however, may not prevent authorized users from copying sensitive information and thereby removing sensitive information to unauthorized locations or computers. Other systems may bind sensitive information to one computer or computing system. However, these systems may be overly restrictive in limiting movement of data.

Thus, there are general needs for systems and methods for flexibly securing sensitive files such that the sensitive files cannot be used outside a secure environment, while still allowing a creator of a file to permit the file to be tethered to one machine regardless of that machine's physical location.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Current corporate and governmental file security systems may seek to ensure the confidentiality of data by reducing or preventing access by unauthorized users. Some systems may attempt to reduce or prevent instances of unauthorized access by requiring that a user enter credentials such as a user name or password. Nevertheless, an adversary who has authorized access to the sensitive data may copy the data to an external drive, such as a USB drive, and remove the sensitive data from authorized premises. Other persons or entities that do not have authorized access may thereafter access the sensitive data.

Some systems may provide an area of device memory, such as an area of a hard disk, which is encrypted upon access to sensitive information. This area may be decrypted upon termination of the access. However, these systems may still allow the data to be left on the hard disk, and the data may therefore still be subjected to brute force attack.

These or other systems may bind the sensitive data to a computing device or a virtual machine, and decrypt the data at the time of access of the data. This approach may aggressively restrict the access of sensitive data by hindering movement of the computing device or virtual machine to another server or data center in the event of network or server failure. Further, these systems do not prevent copying of sensitive data once the data is accessed and decrypted.

Example embodiments may tether sensitive data to a machine or to a virtual machine executing in a trusted network by authenticating the environment in which the data is being saved or accessed. Example embodiments may further provide user authentication mechanisms before the data may be accessed. Example embodiments may provide the option for a creator of a file to enable secured local saving of the file to a machine.

Figure 1:
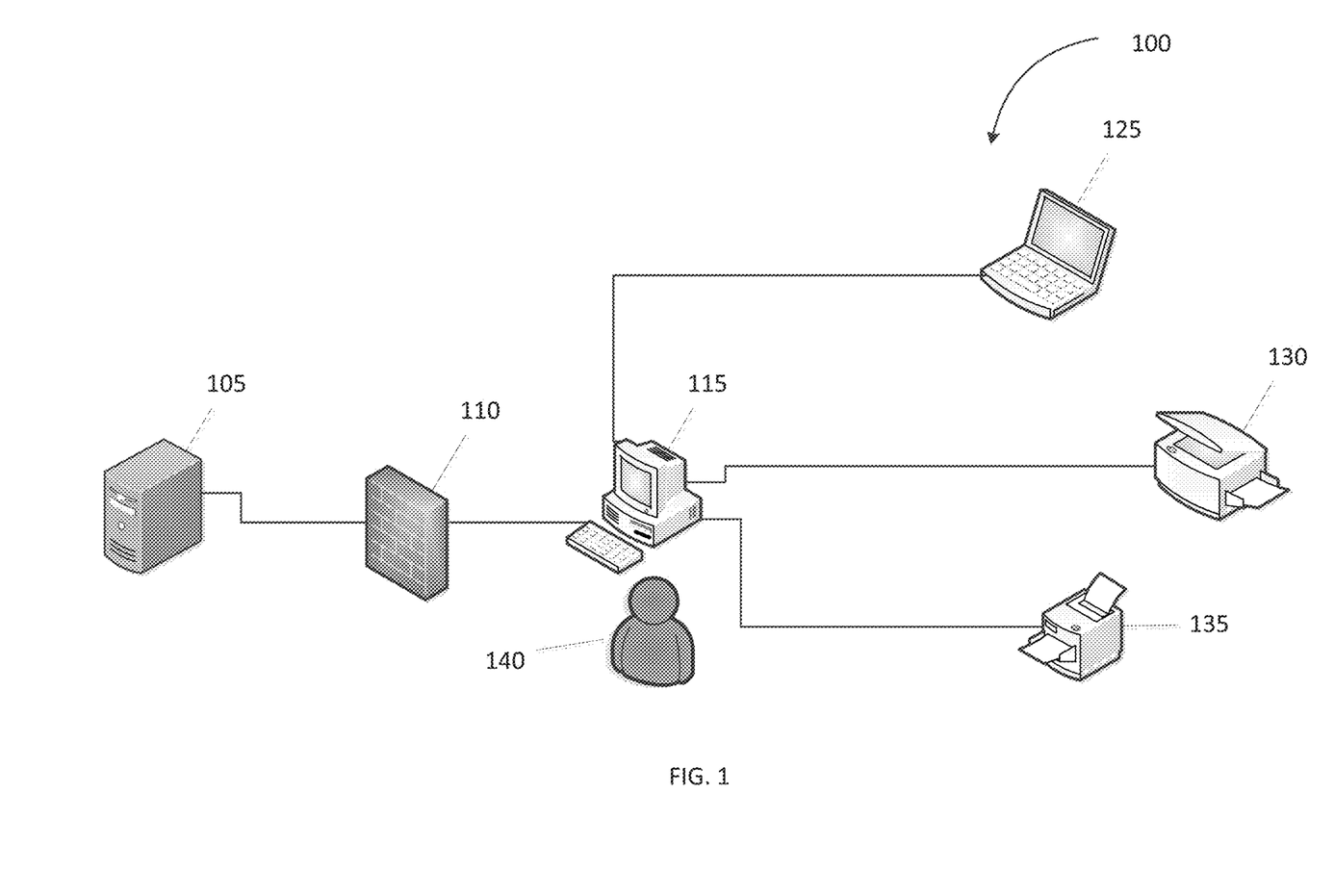
FIG. 1 is a system in accordance with some embodiments.

FIG. 1 is a system 100 in which example embodiments may be implemented. The system 100 includes a server 105 for storage of data files, including sensitive data files. A firewall 110 may be present between the server 105 and at least one user computer or device 115. Other devices 125, 130, and 135 may be in a network, for example a trusted network, with the device 115. A user 140 may wish to create a secured file on the device 115. The device 115 may implement a procedure 200 as discussed below with respect to FIG. 2, to create a secured file.

Figure 2:
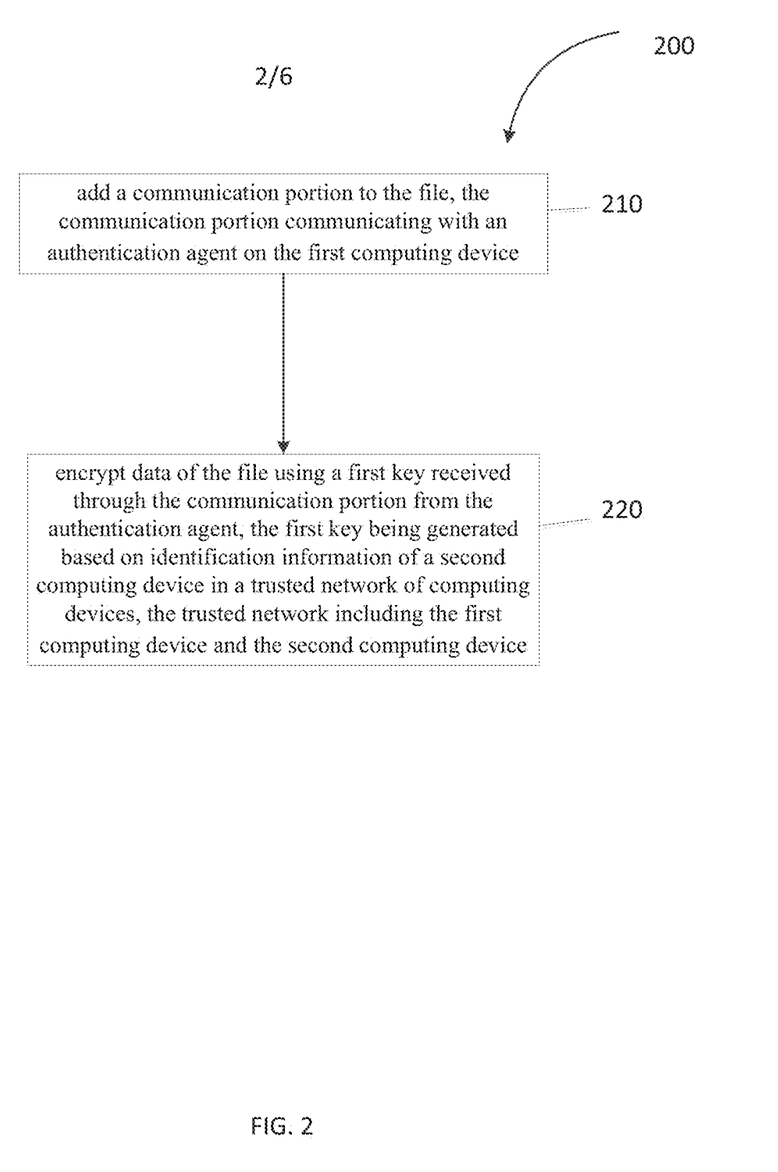
FIG. 2 is a procedure for securing a file in accordance with some embodiments.

FIG. 2 is a procedure 200 for securing a file created on a computing device, for example the device 115 (FIG. 1).

In operation 210, the device 115 may add a communication portion to the file. The communication portion may communicate with an authentication agent executing on the device 115.

In operation 220, the device 115 may encrypt data of the file using a first key received through the communication portion from the authentication agent. The first key may be generated based on identification information of a second computing device in a trusted network of computing devices. The second device may be, for example, one or more of devices 125, 130, or 135 (FIG. 1). The trusted network may include the device 115 and the second computing device.

The identification information of the second computing device 125, 130, or 135 may include a media access control (MAC) address of the second computing device 125, 130, or 135.

In operation 230, the device 115 may save the file to a remote file storage location. For example, the device 115 may save the file to the server 105 (FIG. 1).

The procedure 200 may further include setting a metadata indicator within the file to a value. The value may indicate whether permissions exist to save the file locally to the device 115. If the value indicates that permissions exist to save the file to the device 115, the procedure 200 may further include encrypting data of a second version of the file using a second key received through the communication portion from the authentication agent. The second key may be generated based on identification information of the device 115. The procedure 200 may further include saving the second version of the file to a local storage of the device 115. The procedure 200 may further include setting a second metadata indicator within the file to a value. The value may indicate whether the file has been saved locally on the device 115 so that a user 105 opening the file at a later time can open the file using the second key.

The procedure 200 may further include deleting the file from the device 115 upon closing the file in an editor executing on the device 115 if the indicator has been set to indicate that permissions do not exist for saving the file locally to the device 115. Deleting the file may include removing a pointer to the file. The procedure 200 includes destroying or deleting the unencrypted local file upon closing the file in the editor if the indicator has been set to indicate that permissions do not exist for saving the file locally to the device 115. If the file is to remain locally, the file will be encrypted with the local system key. The procedure 200 may further include destroying the file upon a failure of the communication portion to communicate with the authentication agent. The destroying may include encrypting the file a plurality of times using a random key.

Figure 3:
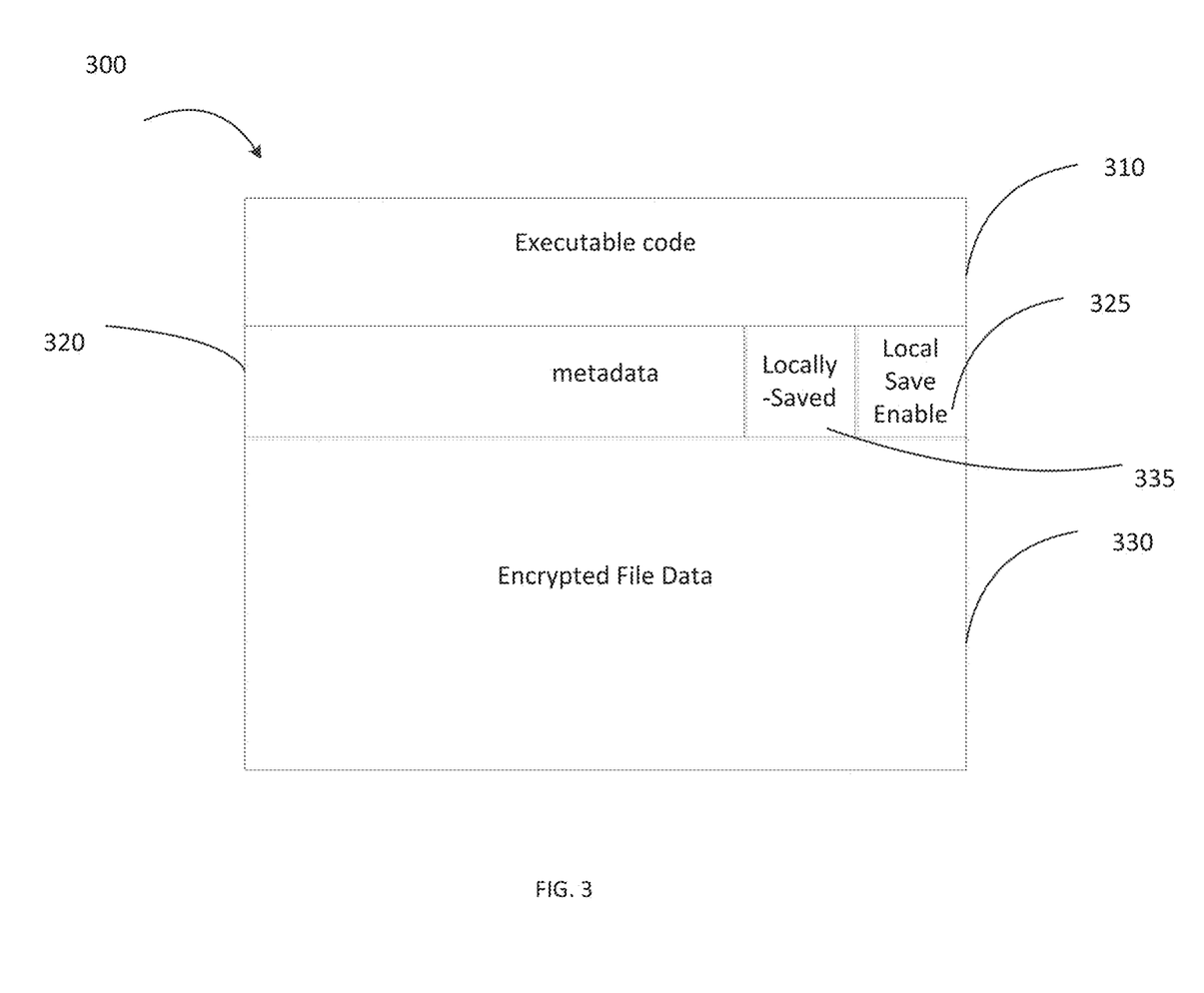
FIG. 3 is a block diagram of a secured file in accordance with some embodiments.

FIG. 3 is an illustrative example of a file 300, secured according example embodiments of the procedure 200. The example file 300 may include executable code 310, for example binary code, etc., for communicating with an authentication agent. The example file 300 may further include metadata 320. The metadata 320 may have an indicator 325, for example a local save enable flag, for indicating whether the file may be saved locally on the device 115. The metadata 320 may have another indicator 335, for example a locally-saved flag, for indicating whether the file was encrypted with a key created based on data of the local machine, such that the file may be opened on the device 115 without being connected to the trusted network. The example file may further include encrypted file data 330 encrypted with, for example, one or more keys received from the authentication agent. The encrypted file data 330 may include data created with various editors, for example text editors, video editors, and graphics editors.

Figure 4:
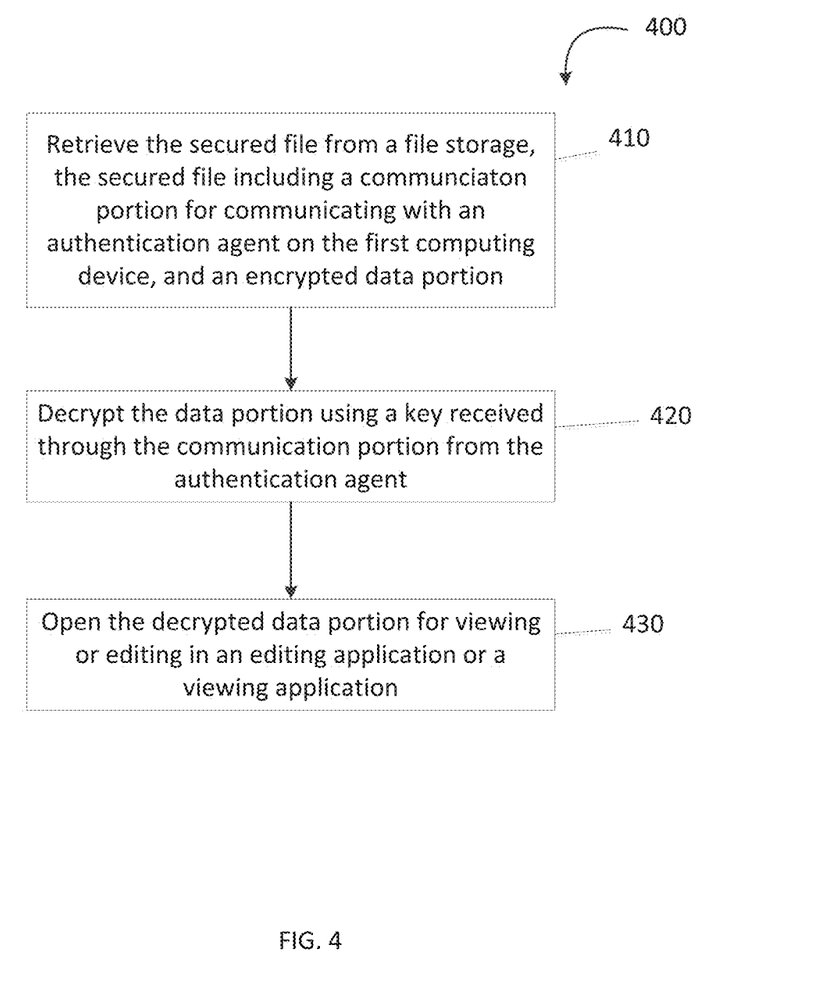
FIG. 4 is a procedure for opening a secured file in accordance with some embodiments.

FIG. 4 is a procedure 400 for opening a secured file on a computing device, for example the device 115 (FIG. 1). The secured file may be similar to the file discussed above with respect to FIG. 3.

In operation 410, the device 115 may retrieve the secured file from a file storage. The secured file, as discussed above with respect to FIG. 3, may include a communication portion for communicating with an authentication agent on the device 115 and an encrypted data portion. The communication portion may be similar to the executable code 310 (FIG. 3). The encrypted data portion may be similar to the encrypted file data 330 (FIG. 3).

The file storage may be a remote file storage. The key may be based on identification information of at least one other device, such as for example a computer, router, switch, or other network element in the network. For example, the key may be based on identification information of the device 125, 130 or 135 (FIG. 1). The identification information may be, for example, a MAC address of the device 125, 130 or 135, a secured shell (SSH) key of the device 125, 130 or 135, service names and port numbers on which services are communicating on the device 125, 130, or 135, etc.

In operation 420, the device 115 may decrypt the data portion using a key received through the communication portion from the authentication agent.

In operation 430, the device 115 may open the decrypted data portion for viewing or editing in an editing application or a viewing application.

The procedure 400 may further include authenticating access permissions of the device 115 to the remote file storage. The authenticating may be performed through, for example, a lightweight directory access protocol (LDAP) mechanism, through an Active Directory mechanism, etc.

The procedure 400 may further include determining that permissions for local file storage are enabled based on an inspection of a value of a metadata indicator within the secured file. The metadata indictor may be similar to the local save enable flag 325 (FIG. 3). The procedure 400 may further include retrieving the secured file from a local memory, wherein the key for the decrypting is based on identification information of the device 115, based on the value of the metadata indicator. The procedure 400 may further include examining the metadata to determine whether a second indicator was set, indicating that the file was saved locally, and opening the file using on a local key or a remote key based on the value of the second indicator. The second indicator may be similar to the locally-saved indicator 335 (FIG. 3).

The procedure 400 may further include destroying the file upon a failure of the communication portion to communicate with the authentication agent. Destroying the file may include encrypting the file a plurality of times using a random key, for example.

Figure 5:
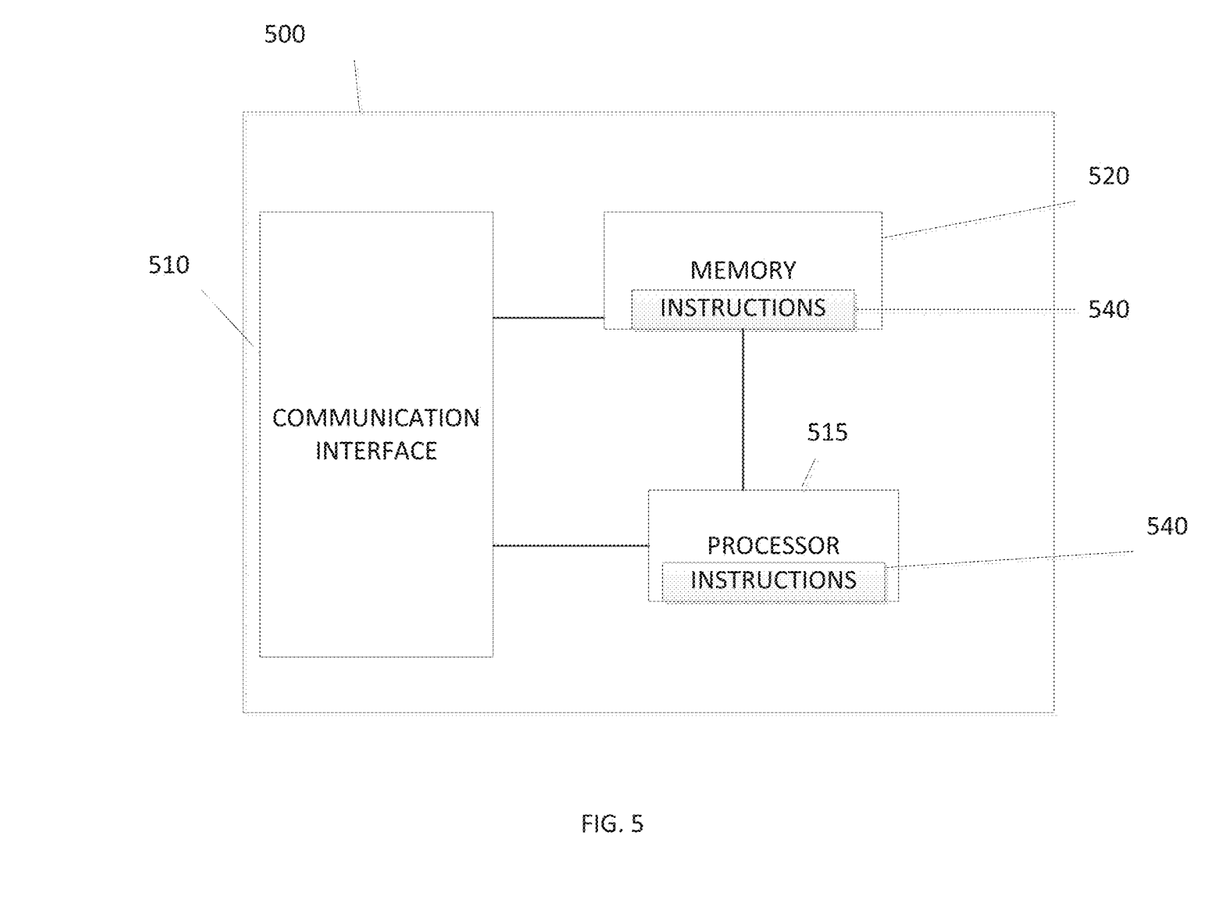
FIG. 5 is a block diagram of a system for implementing procedures in accordance with some embodiments.

FIG. 5 is a block diagram of a computer 500 for implementing methods according to example embodiments. The computer 500 may be appropriate for performing the functionalities of the device 115 (FIG. 1). The computer 500 may be appropriate for viewing and editing files of various types.

Figure 6:
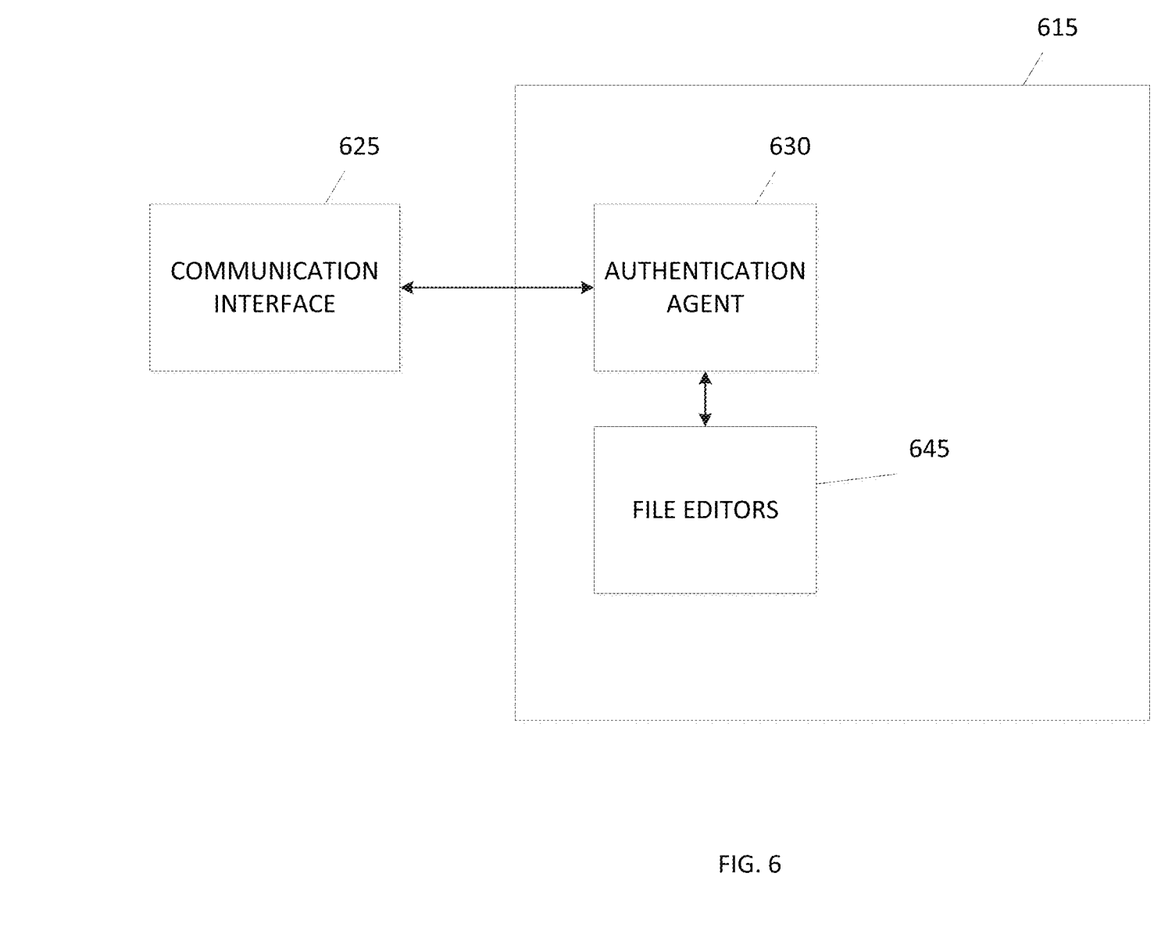
FIG. 6 is a block diagram of a processor for implementing procedures in accordance with some embodiments.

The computer 500 may include a communication interface 510. The computer 500 may include a processor 515. The processor 515 may include components as shown in FIG. 6. Referring to FIG. 6, the processor 615 may include an authentication agent 620 and one or more file editors 630. The authentication agent 610 may communicate with a remote file storage, for example the server 105 (FIG. 1) over the communication interface 625.

The one or more file editors 630 may be used to create a secured file as described above with respect to FIG. 2-3. The secured file may include a communication portion for requesting the encryption key from the authentication agent and a data portion including data encrypted with the encryption key. The communication portion may be similar to the executable code 310 (FIG. 3). The data portion may be similar to the encrypted file data 330 (FIG. 3).

The authentication agent 630 may generate the encryption key based on identification information of the computer 500 or upon a second computing device in a trusted network with the computer 500, for example the devices 125, 130 or 135 (FIG. 1). For example, the authentication agent may retrieve data specific to different machines in the networked environment, such as router names, computer medium access control (MAC) addresses, etc. The data obtained may be unique for each sensitive data file, and the identity of the components of data used for creation of the key may be stored in metadata inside the sensitive data file. The metadata may be stored such that the actual key locations are not visible to the end user. For example, the actual key locations may be hashed, and the communication interface 510 may use the hash to look up the actual key location.

The authentication agent 630 may further be arranged to save the secured file to the remote file storage, for example the server 105 (FIG. 1). The authentication agent 630 may be arranged to save the secured file to local file storage, for example to memory 520 (FIG. 5). The authentication agent 630 may be arranged to save the secured file to both remote file storage and local file storage, based on an indicator in the metadata of the secured file.

Referring again to FIG. 5, the computer 500 may store the secured file locally in a memory 520. In one embodiment, the memory 520 includes, but is not limited to, random access memory (RAM), dynamic RAM (DRAM), static RAM (SRAM), synchronous DRAM (SDRAM), double data rate (DDR) SDRAM (DDR-SDRAM), or any device capable of supporting high-speed buffering of data. The computer 500 may include computer instructions 540 that, when implemented on the computer 500, cause the computer 500 to implement functionality in accordance with example embodiments.

For example, the computer instructions 540 may, when executed on the computer 500, cause the computer 500 to receive a request for a first encryption key for encrypting a file. The computer instructions 540 may, when executed on the computer 500, cause the computer 500 to query a first network device for data of the first network device. The first network device may be a member of a trusted network including at least the first network device and the computer 500. For example, the first network device may be the device 125, 130, or 135 (FIG. 1). The computer instructions, when executed on the computer 500, may cause the computer 500 to create the first encryption key using the data of the first network device and write a secured file to a file storage. The secured file may include an encrypted data portion encrypted with the first encryption key. The encrypted data portion may be similar to the encrypted file data 330 (FIG. 3).

The instructions 540 may be stored on a computer-readable storage device, which may be read and executed by at least one processor 515 to perform the operations described herein. In some embodiments, the instructions 540 are stored on the processor 515 or the memory 520 such that the processor 515 or the memory 520 act as computer-readable media. A computer-readable storage device may include any non-transitory mechanism for storing information in a form readable by a machine (e.g., a computer). For example, a computer-readable storage device may include ROM, RAM, magnetic disk storage media, optical storage media, flash-memory devices, and other storage devices and media.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method performed by a first computing device for securing a file created on the first computing device, the method comprising:
   adding a communication portion as executable code to the file, the communication portion communicating with an authentication agent on the first computing device to retrieve identification information of machines remote to the first computing device in a trusted network, the trusted network including the first computing device;
   encrypting data of the file using a first key received through the communication portion from the authentication agent, the first key being generated based on data from a first machine of the machines;
   adding a metadata field to the file to indicate a key location of the first key including identification information of the machines, the metadata field including a plurality of hashed values indicating respective locations of the machines including the first machine;
   saving the file to a remote file storage location;
   setting a metadata indicator within the file to a value, the value indicating whether permissions exist to save the file locally to the first computing device; and
   if the value indicates that permissions exist:
      receiving a second key through the communication portion from the authentication agent, the second key being generated based on identification information of the first computing device;
      encrypting data of a second version of the file using the received second key; and
      saving the encrypted second version of the file to a local memory of the first computing device; and
   if the value indicates that permissions do not exist, deleting the file from the first computing device in response to closing the file in an editor.

2. The method of claim 1, wherein the identification information of the first machine includes a media access control (MAC) address of the first machine.

3. The method of claim 1, further comprising:
   destroying the file upon a failure of the communication portion to communicate with the authentication agent.

4. The method of claim 3, wherein the destroying comprises:
   encrypting the file a plurality of times using a random key.

5. A method performed by a first computing device for opening a secured file on the first computing device, the method comprising:
   retrieving the secured file from a file storage remote to the first computing device, the secured file including a communication portion that was added as a wrapper to the secured file by the first computing device and that includes executable code for communicating with an authentication agent on the first computing device to authenticate an environment on which the secured file is being opened, the environment including machines remote to the first computing device in a trusted network with the first computing device, an encrypted data portion, and a metadata field;
   decrypting the data portion using a key received through the communication portion from the authentication agent, the key including key locations that correspond to identification information of a first machine of the machines, the key generated based on data from the first machine of the machines, the metadata field including a plurality of hashed values indicating respective locations of the machines including the first machine;
   opening the decrypted data portion for viewing or editing in an editing application or a viewing application;
   determining whether permissions for local file storage are enabled based on an inspection of a value of a metadata indicator within the secured file; and
   if the value indicates that permissions exist:
      receiving a second key through the communication portion from the authentication agent, the second key being generated based on identification information of the first computing device;
      encrypting data of a second version of the secured file using the received second key; and
      saving the encrypted second version of the secured file to a local memory of the first computing device; and
   if the value indicates that permissions do not exist, deleting the secured file from the first computing device in response to closing the file in an editor.

6. The method of claim 5, wherein:
   the file storage is a remote file storage.

7. The method of claim 6, further comprising:
authenticating access permissions of the at least one other computing device to the remote file storage.

8. The method of claim 7, wherein the authenticating is performed through a lightweight directory access protocol (LDAP) mechanism or through an Active Directory mechanism.

9. The method of claim 5, further comprising:
retrieving the secured file from a local memory, wherein the key for the decrypting is based on identification information of the first computing device.

10. The method of claim 5, further comprising:
destroying the file upon a failure of the communication portion to communicate with the authentication agent.

11. A non-transitory computer-readable medium comprising instructions that, when executed on a machine, cause the machine to:
receive, from a first computing device, a request for a first encryption key for encrypting a file, wherein the request is received over a connection to a communication portion of the file, the communication portion comprising a wrapper including computer-executable code to retrieve environment information of the machine, wherein the environment information includes identification information of a first network device of at least two other network devices in a trusted network of the first computing device;
query the first network device of the network devices for data of the first network device, the first network device being a member of the trusted network including at least the first network device and the machine;
create the first encryption key using the data of the first network device, the data being collected by an aggregation server;
add a metadata field to the file to indicate a key location of the first encryption key including identification information of the network devices, the metadata field including a plurality of hashed values indicating respective locations of the network devices;
write a secured file to a file storage, the file storage remote from the first computing device, the secured file including an encrypted data portion encrypted with the first encryption key, and the secured file further including a metadata portion to indicate key locations within the first encryption key that correspond to locations of the data collected by the aggregation server;
set a metadata indicator within the file to a value, the value indicating whether permissions exist to save the file locally to the first computing device;
receive, from the first computing device, a request for a second encryption key for encrypting a file, wherein the request is received over the connection to the communication portion of the file;
if the value indicates that permissions exist:
create a second encryption key using identification information data of the first computing device, the data being collected by an aggregation server;
add a metadata field to a second version of the file to indicate a key location of the second encryption key including identification information of the first computing device;
encrypt data of a second version of the file using the second encryption key; and
write the encrypted second version of the file to a local memory of the first computing device; and
if the value indicates that permissions do not exist,
delete the file from the first computing device in response to the file being closed in an editor.

12. The computer-readable medium of claim 11, wherein the data of the first network device includes a medium access control (MAC) address of the first network device.

13. The computer-readable medium of claim 11, further comprising instructions that, when executed on the machine, cause the machine to:
receive a request for a decryption key for decrypting the file; and
provide the first encryption key or the second encryption key in response to the request based on the value of the indicator.

14. An apparatus comprising:
a communication interface;
a computer processor, to communicate with a remote file storage over the communication interface, and generate a first encryption key based on identification information of a first machine of machines in a trusted network with the apparatus, the identification information being collected by an aggregation server; and
one or more file editors executing on the processor to create a secured file, the secured file including a communication portion comprised of a wrapper including executable code for retrieving environment information, through an authentication agent, of the apparatus and for requesting the first encryption key from the authentication agent and a data portion including data encrypted with the first encryption key, and the secured file further including a metadata field to indicate a key location of the first encryption key, including a plurality of hashed values indicating respective locations of the machines; and
wherein the one or more file editors is further configured to:
save the secured file to remote file storage;
set a metadata indicator within the secured file to a value, the value indicating whether permissions exist to save the secured file locally to the apparatus; and
if the value indicates that permissions exist:
request a second encryption key, via the communication interface, using identification information data of the apparatus;
receive the second encryption key through the communication portion from the authentication agent;
create a secured second version of the file using the second encryption key; and
write the secured second version of the file to a local memory of the apparatus; and
if the value indicates that permissions do not exist,
delete the file from the apparatus in response to closing the file in the one or more file editors.

15. The apparatus of claim 14, further comprising a memory for local file storage of the secured file.

16. The apparatus of claim 14, further comprising:
a credentials agent to authenticate the apparatus to the remote file storage.

* * * * *

UNITED STATES PATENT AND TRADEMARK OFFICE
CERTIFICATE OF CORRECTION

PATENT NO. : 9,697,372 B2
APPLICATION NO. : 13/846974
DATED : July 4, 2017
INVENTOR(S) : Neumann et al.

Page 1 of 1

It is certified that error appears in the above-identified patent and that said Letters Patent is hereby corrected as shown below:

In the Specification

In Column 2, Line 66, delete "105" and insert --140-- therefor

In Column 4, Line 30, delete "620" and insert --630-- therefor

In Column 4, Line 30, delete "630." and insert --645.-- therefor

In Column 4, Line 31, delete "610" and insert --630-- therefor

In Column 4, Line 34, delete "630" and insert --645-- therefor

In Column 4, Line 35, delete "FIG." and insert --FIGS.-- therefor

Signed and Sealed this
Fourteenth Day of April, 2020

Andrei Iancu
*Director of the United States Patent and Trademark Office*